May 24, 1966   KARL-HEINZ ECKHARDT ETAL   3,252,430
BOX-SHAPED BODY FOR STREET AND RAIL VEHICLES
Filed May 31, 1963                             3 Sheets-Sheet 3

United States Patent Office 3,252,430
Patented May 24, 1966

3,252,430
BOX-SHAPED BODY FOR STREET AND
RAIL VEHICLES
Karl-Heinz Eckhardt, Minden, and Christian J. Stiefel
and Ferdinand Mahr, Aachen, Germany, assignors to
Waggonfabrik Talbot, Aachen, Germany
Filed May 31, 1963, Ser. No. 284,417
Claims priority, application Germany, June 2, 1962,
W 32,358
7 Claims. (Cl. 105—238)

The present invention relates to a closed box-shaped body for street and rail vehicles for the transport of freight and passengers.

It is known to build a box-shaped body as a continuous substantially unitary structure extending from one end to the other end of the vehicle to be equipped with such body. Such unitary body structure comprises side walls and end walls, a roof and a bottom formed by the understructure of the vehicle. Each of the walls confining the inner vehicle space comprises outer and inner planks or sheeting mounted on both sides of a supporting structure composed of structural metal members. Said blanks or sheeting confine with each other a jacket which is sealed more or less with regard to the outer air. In this way, hollow walls are formed which have various thicknesses and a relatively large area while consisting of a great number and sometimes complicated individual parts. The production and mounting of such hollow walls is time-consuming and requires highly skilled labor. Additional work is to be done if such walls have to be insulated against heat or cold, as is the case, for instance with refrigerator cars or with air-conditioned cars. In such instances, the walls become unusually thick even if, in a manner known per se, the inner surface of the outer and inner planks or sheeting are covered with thermic insulating substances or are sprayed, or if the entire jacket is filled with insulating material.

The effect of the insulating material is disadvantageously reduced by the great number of interconnecting metal profiles of the supporting structure or skeleton which connect the outer wall with the inner wall. The heretofore known ways of constructing such box-shaped bodies do not bring about an effective continuous sealing of the jacket with regard to the outer air so that, depending on the weather, the air will be able with a different degree of humidity, temperature and admixtures to pass through the jacket and bring about corrosion and the formation of corrosion nests which then require certain steps in order to be remedied, or precautionary measures have to be taken to prevent the occurrence of such corrosion.

It is, therefore, an object of the present invention to provide a car body which will overcome the above mentioned drawbacks.

It is another object of this invention to provide a car body which may be built up of a number of identical elements in the manner of building blocks while affording insulation against heat and cold and protection against corrosion.

These and other objects and advantages of the invention will appear more clearly from the following specification in connection with the accompanying drawings, in which.

Figure 4:
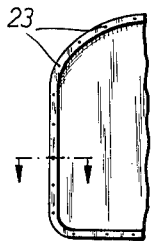

FIG. 4 diagrammatically illustrates half a cross section through a car body according to the present invention.

Figure 1:
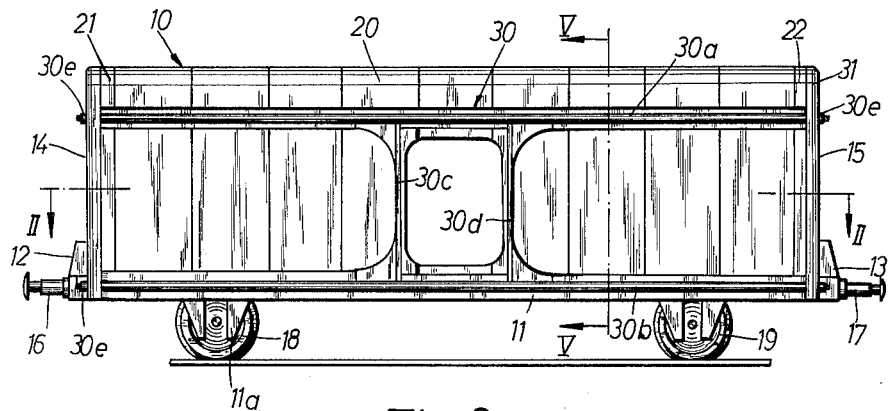
FIG. 1 illustrates a side view of a box car with a car body according to the present invention.
Figure 2:
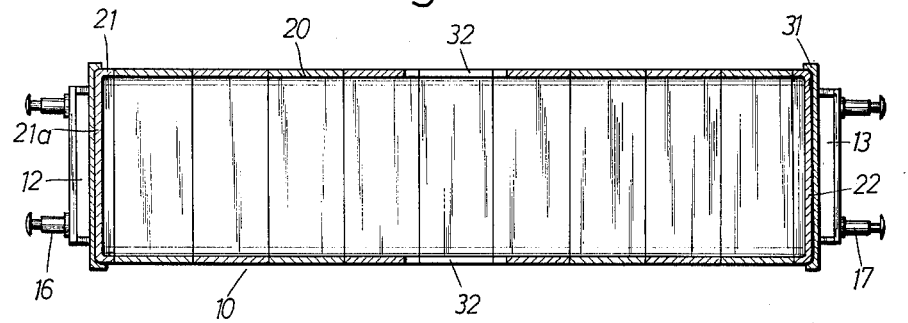
FIG. 2 is a section taken along the line II—II of FIG. 1.
Figure 5:
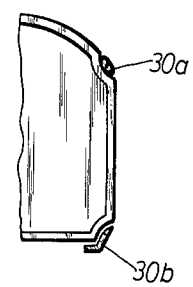

FIG. 5 diagrammatically illustrates half a cross section through a modified car body according to the invention, said section being taken along the line V—V of FIG. 1.

Figure 6:
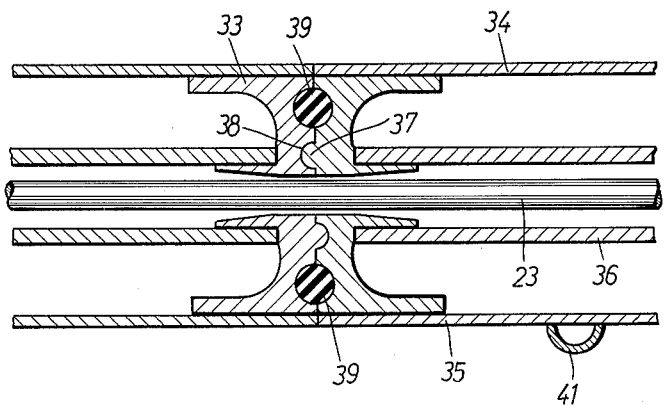

FIG. 6 illustrates on a considerably larger scale than that of FIG. 4 a section taken along the line VI—VI of FIG. 4.

Figure 7:
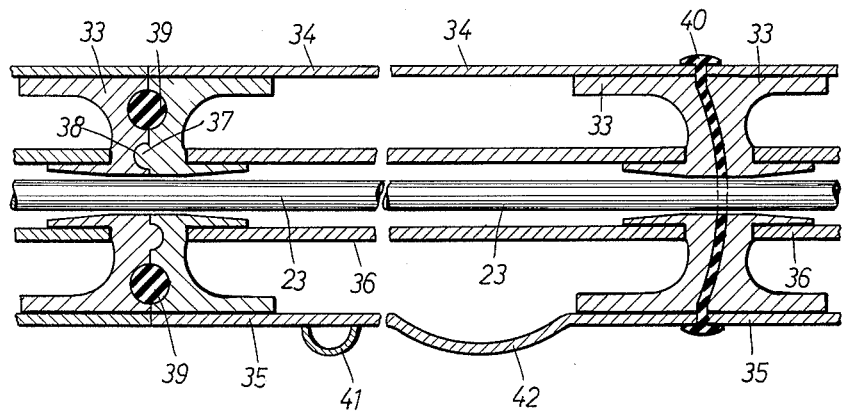

FIG. 7 is a section similar to that of FIG. 6 but illustrates a modified body wall according to the present invention.

Figure 8:
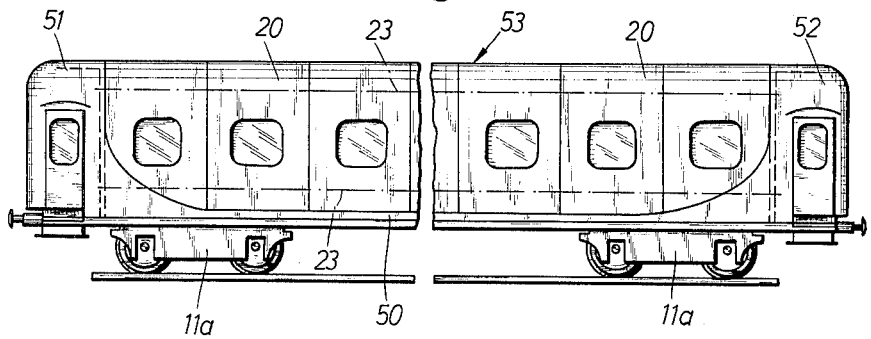

FIG. 8 is a side view of a car body according to the invention for a passenger car in which said car body rests on a bottom structure on the understructure of the car.

Figure 9:
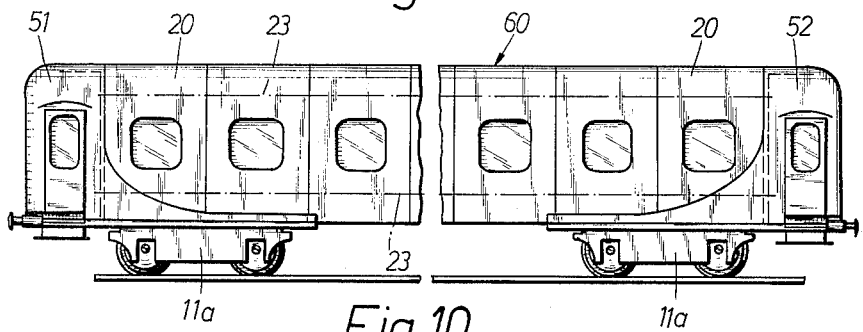

FIG. 9 represents a side view of a car body according to the invention for a passenger car which differs from that of FIG. 8 inasmuch as it is self-supporting.

Figure 10:
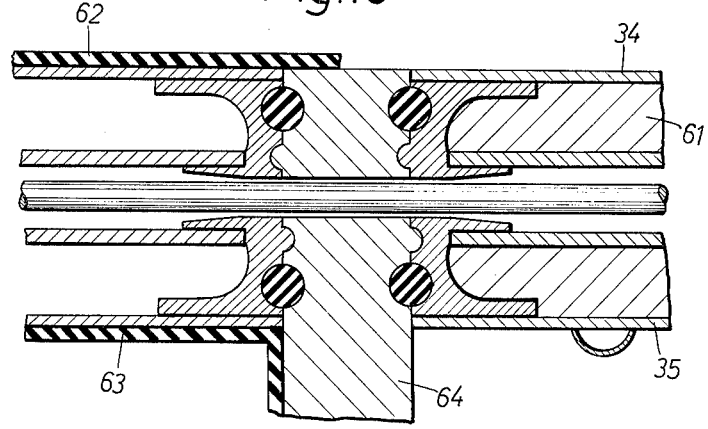

FIG. 10 shows how a partition could be included in the car body structure.

A car body according to the present invention is characterized primarily in that it is composed of a plurality of individual pre-fabricated annular elements arranged one behind the other in longitudinal direction of the car and pulled against each other by means of tie rods or the like. According to a practical embodiment of the invention, each annular member forms a jacket section which with profiled members at each end face thereof forms a cell closed on all sides. This cell forms a section of the side walls, the roof and the bottom of the car body. In order to obtain a good air circulation between the loaded goods and the walls, for instance in refrigerator cars, the inner walls of the annular or tubular members are either plane and provided with protrusions or corrugated. The end faces of the tubular members are so designed as to mutually center and seal each other. For holding the tubular members together, there are provided tie rods which extend in longitudinal direction of the car and between the inner and outer walls of said tubular members.

According to another embodiment of the invention, the tubular members are held against each other by means of tie frames arranged on the outside of said tubular members and extending in the longitudinal direction of the respective car. These tie frames are connected to the understructure so as to form a combined supporting structure. Advantageously, vertical connections are provided between the upper and lower girder of the tie frame and form door posts. The tubular members may furthermore be provided with cutouts for the insertion of window frames, door frames, and the like.

The tubular members have between their end faces elastic layers. In order to be able to employ the tubular members as supporting members, they may have their end faces in direct engagement with each other. If transverse walls are desired or required, such walls may be provided between the end faces of adjacent tubular members.

When employing the invention for a passenger car, the tubular members may be mounted on a self-supporting understructure between the two end sections of a car which contain the stairs. However, if desired, the tubular members may also be arranged between the said two end sections while forming a self-supporting car body.

Referring now to the drawings in detail, the car body according to the present invention rests on an understructure 11 the end beams 12 and 13 of which have extensions overlying the end faces 14 and 15 of the car body in order in this way to secure the car body against displacement relative to the understructure 11. The end beams 12 and 13 are in a manner known per se provided with buffers 16 and 17. The understructure 11 furthermore carries the trucks 11a with wheels 18 and 19.

The car body 10 is composed of a plurality of substantially identical tubular members or bodies 20 which are aligned in longitudinal direction of the car and are tied together. For instance there may be provided nine of such tubular members 20 with two end or terminal members or bodies 21, 22 which latter form the end walls of the car body.

Figure 3:
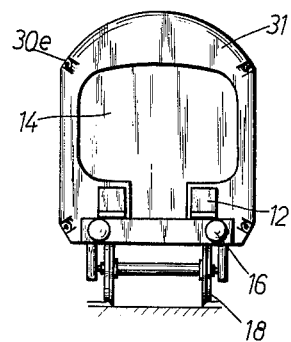
FIG. 3 is a diagrammatic front view of the car according to FIG. 1.

According to the embodiment of FIG. 1, the understructure 11 is self-supportieng in a manner known per se. Tie rods 23 (FIGS. 3 and 4) extend in longitudinal direction of the car body between the inner and outer wells of said tubular members 20 and through the end members 21, 22 and have their ends provided with tightening elements, as for instance nuts 30e, so that by tightening said nuts the tubular members will be tied together.

It is, of course, to be understood that instead of employing tie rods 23 extending from one end to the other end of the car body, it is also possible to provide short tie means which interconnect only each two adjacent tubular members and tubular member and end member respectively so that in this way sequentially every two adjacent members of the car body can be tied together.

According to a modification illustrated in FIGS. 1 and 5, the individual tubular members 20 and the end members 21, 22 are tied together by means of a tie frame 30. In this instance, the upper and lower frame girders 30a, 30b extend from one end of the car body to the other end thereof and are arranged outside the said tubular members. The frame girders are by means of vertical structural members 30c, 30d fixedly connected to each other as well as to the understructure 11. The lower girder 30b may at the same time form the longitudinal beam of the understructure so that these elements in combination with each other will yield a self-supporting structure. As will be evident from FIG. 5, the walls of the tubular members 20 may be provided with depressions so that the upper and lower girders 30a, 30b will be located within the general outer contour of the car body. At the end of the girders 30a, 30b there are provided tie means, as for instance nuts 30e, which in cooperation with pressure plates 31 resting on the end faces 14, 15 for purposes of distributing the tie forces, will make possible the proper tying of the tubular members. The vertical bars 30c, 30d may also serve as door posts or connecting means for window frames and the like. To this end, they are arranged in the respectively required range of cutouts 32 for doors, windows, and similar openings.

The tubular members 20 represent structural elements which as will be evident from FIGS. 6 and 7, form a jacket of tubular cross section and rectangular longitudinal section. The ends of said tubular members, and the open ends of the terminal or end members are closed by profed filling members 33 so that each tubular and terminal member forms a substantially air-tight cell. The outer walls 34, the inner walls 35 and the profiled members 33 may be made in any desired combination of steel, light metal, synthetic material, glass fiber reinforced synthetic resin, or the like. The tie rods 23 extend through the jacket between the inner and outer walls and extend through tubes 36 as is clearly shown in FIGS. 6 and 7. As will be evident from FIG. 6, the profiled members 33 may be centered relative to each other by means of protrusions 37 and recesses 38 which interengage when aligning the tubular members.

As illustrated in FIG. 7, however, the profiled members 33 may be arched in a convex or concave manner and interengage each other. Between each two adjacent profiled members there are provided elastic inserts or insert layers 39, 40. According to FIG. 6, the inserts 39 extend over a portion only of the cross section of the tubular member, whereas according to FIG. 7 the insert 40 extends over the cross section of the tubular member and in addition thereto over the end faces of the respective inner and outer walls.

With the arrangement of tie rods 23 according to FIG. 4 and with the provision of tie frames 30 according to FIGS. 1, 2, 3 and 5, the tubular members 20 freely rest on the understructure 11. They are merely clamped in between the clamping elements 30e while they center each other and by means of the elastic inserts and intermediate layers 39 and 40 respectively are sealed with regard to the outside. The elastic inserts 40 while being able to compensate for change in the length of said tubular members as they may be caused by load or heat, are not suitable to transfer great forces and, therefore, require a self-supporting structure which according to FIGS. 1, 2, 3 and 5 comprises an understructure 11 and tie frames 30.

When omitting the elastic inserts 40 between the respective adjacent tubular members 20, it is possible when suitably shaping the surface of the end faces of said tubular members to employ the tubular cross sections for purposes of transferring forces regardless of whether or not elastic inserts 39 are provided. It will be noted that the cross sections of the tubular members have a considerably larger surface than the cross sections of the frame girders 30a, 30b. In this way, the upper and lower girder may be dimensioned smaller.

When employing the structure according to the present invention to special cars, as for instance refrigerator cars, corrugated walls 42 or for instance semi-tubular profiles 41 may be provided on the inside of the tubular sections so that the load will be held in somewhat spaced relationship to the tubular members for allowing air circulation between the latter and the goods. Such corrugations or the like may be connected to the inner walls of the tubular members in any convenient manner, for instance by welding or by adhesive means, or the corrugations may form an integral part of the inner wall itself.

The end members 21 are designed in a manner similar to the tubular members 20 but differ therefrom in that one end is closed by a wall 21a forming one of the very end walls of the car body. Depending on the length of the car, the end members 21, 21a may be replaced by a plane end wall without an annular extension and may be tightened against the respective adjacent or last tubular member 20. When employing the tubular members according to the invention for building up air-conditioned vehicles or refrigerator cars, the space between the inner and outer walls of said members may be filled with a heat or cold insulating substance, as for instance foam rubber, or the outer or inner walls may be covered or sprayed by an insulating substance (see FIG. 10).

By providing partitions between two adjacent tubular members 20, the car body can in a simple manner be subdivided into a plurality of individual chambers or compartments (see FIG. 10).

FIG. 8 illustrates a four-axle passenger car having a not fully self-supporting understructure with beams 50 while the ends thereof are provided with end sections 51, 52 which carry the stairs. Between the said end sections there are arranged the tubular members 20 in such a way that they form the bottom of the understructure and thus together with the understructure form a self-supporting car. The tubular members 20 resting on the understructure including the beams 50 fit between the end sections 51 and 52 and are tied to the latter by means of the elastically extended tie rods 23 which may be arranged in conformity with FIG. 4 but may be less in number, preferably four. The tubular members 20 are in conformity with FIG. 6 so arranged that their end faces directly engage each other with elastic inserts 39 interposed therebetween and provided with centering protrusions and recesses 37, 38 respectively. The effect of this arrangement consists in that under load within the range of the cross section of the tubular members a pressure will occur which can easily be absorbed by the large cross section of the tubular members while the pull in the elastically extended tie rods 23 remains still sufficient to assure a tight engagement between and the centering effect of the tubular members.

FIG. 9 shows a further embodiment for a passenger car which takes advantage of the fact that the car body 60 is self-supporting. According to the embodiment of FIG. 9, the supporting beams 50 of FIG. 8, which extend from one end to the other end of the car, have been completely omitted while the trucks 11a carry the ends of the car body and are interconnected by the self-supporting car body which similar to the arrangement of FIGS. 4 and 8 is built up by a plurality of self-supporting tubular members tied together by tie rods 23 the number of which and distribution over the cross section of the tubular members may vary in conformity with the requirements.

In FIG. 10, the car body structure includes a transverse partition member 64 interposed between adjacent ones of said bodies and interfitting therewith. This view also shows the application of outer covering 62 and inner covering 63 to the car body structure. In this view 61 is a filling material disposed between inner and outer walls 35 and 34 and may be insulation material.

It is, of course, to be understood that the present invention, is by no means, limited to the particular constructions shown in the drawings but also comprises any modifications within the scope of the appended claims.

What we claim is:

1. A closed car body structure for street and rail vehicles, which comprises: a plurality of individual prefabricated bodies in end to end aligned relation and including two terminal bodies closed on the side forming the end of the car body structure and open on the other side, said prefabricated bodies also including a plurality of tubular bodies open at both ends and interposed between said terminal bodies, each body comprising spaced inner and outer walls which are substantially closed on themselves in the circumferential direction of the bodies, filling members at the open ends of said bodies filling the space between said inner and outer walls thereof, means on each said filling members adapted to interfit with complementary shaped means on the adjacent filling member of the adjacent body to align said bodies and to transmit loads therebetween, resilient sealing means compressed between adjacent ones of said filling members for sealing adjacent bodies to each other, a plurality of tension elements distributed about the car body structure and extending longitudinally from end to end thereof and clamping said plurality of bodies together to form a rigid sealed car body structure, and a substantially rigid understructure engaging the bottom of said car body structure and extending longitudinally thereof and including portions extending vertically therefrom at the ends and engaging the closed sides of said terminal bodies.

2. A closed car body structure for street and rail vehicles, which comprises: a plurality of individual prefabricated bodies in end to end aligned relation and including two terminal bodies closed on the side forming the end of the car body structure and open on the other side, said prefabricated bodies also including a plurality of tubular bodies open at both ends and interposed between said terminal bodies, each body comprising spaced inner and outer walls which are substantially closed on themselves in the circumferential direction of the bodies, filling members at the open ends of said bodies filling the space between said inner and outer walls thereof, means on each said filling members adapted to interfit with complementary shaped means on the adjacent filling member of the adjacent body to align said bodies and to transmit loads therebetween, resilient sealing means compressed between adjacent ones of said filling members for sealing adjacent bodies to each other, a plurality of tension elements distributed about the car body structure and extending longitudinally from end to end thereof and clamping said plurality of bodies together to form a rigid sealed car body structure, and a substantially rigid understructure, engaging the bottom of said car body structure and extending longitudinally thereof and including portions extending vertically therefrom at the ends and engaging the closed sides of said terminal bodies, said tension elements being located between said inner and outer walls of said bodies.

3. A closed car body structure for street and rail vehicles, which comprises: a plurality of individual prefabricated bodies in end to end aligned relation and including two terminal bodies closed on the side forming the end of the car body structure and open on the other side, said prefabricated bodies also including a plurality of tubular bodies open at both ends and interposed between said terminal bodies, each body comprising spaced inner and outer walls which are substantially closed on themselves in the circumferential direction of the bodies, filling members at the open ends of said bodies filling the space between said inner and outer walls thereof, means on each said filling members adapted to interfit with complementary shaped means on the adjacent filling member of the adjacent body to align said bodies and to transmit loads therebetween, resilient sealing means compressed between adjacent ones of said filling members for sealing adjacent bodies to each other, a plurality of tension elements distributed about the car body structure and extending longitudinally from end to end thereof and clamping said plurality of bodies together to form a rigid sealed car body structure, and a substantially rigid understructure, engaging the bottom of said car body structure and extending longitudinally thereof and including portions extending vertically therefrom at the ends and engaging the closed sides of said terminal bodies, said tension elements being located outside said bodies, and said bodies being recessed for receiving said elements whereby there is substantially no protrusion of said tensioning elements outwardly from the car body structure.

4. A closed car body structure for street and rail vehicles, which comprises: a plurality of individual prefabricated bodies in end to end aligned relation and including two terminal bodies closed on the side forming the end of the car body structure and open on the other side, said prefabricated bodies also including a plurality of tubular bodies open at both ends and interposed between said terminal bodies, each body comprising spaced inner and outer walls which are substantially closed on themselves in the circumferential direction of the bodies, filling members at the open ends of said bodies filling the space between said inner and outer walls thereof, means on each said filling members adapted to interfit with complementary shaped means on the adjacent filling member of the adjacent body to align said bodies and to transmit loads therebetween, resilient sealing means compressed between adjacent ones of said filling members for sealing adjacent bodies to each other, a plurality of tension elements distributed about the car body structure and extending longitudinally from end to end thereof and clamping said plurality of bodies together to form a rigid sealed car body structure, and a substantially rigid understructure, engaging the bottom of said car body structure and extending longitudinally thereof and including portions extending vertically therefrom at the ends and engaging the closed sides of said terminal bodies, said tensioning elements comprising a part of a frame positioned outside said bodies, said frame including vertical elements extending between and connected to said tensioning elements and also connected to said understructure.

5. A car body structure according to claim 1 in which said tensioning elements include a pair arranged at the bottom of each side of the bodies and also forming longitudinal members of said understructure.

6. A car body structure according to claim 1 in which said tensioning elements include clamping elements on the ends thereof engaging the closed sides of said terminal bodies and adjustable on their respective tensioning elements for effecting the distribution of the clamping forces circumferentially of the bodies.

7. A car body structure according to claim 1 which includes at least one partition member extending transversely of the car body structure and interposed between a pair of adjacent ones of said bodies, said partition members having substantially uniform thickness in the longitudinal direction of the car body structure and substantially the same dimensions as the adjacent bodies in the vertical and transverse directions and including means on opposite sides within the range of the adjacent filling members of the adjacent bodies adapted to interfit with the said means on said filling members to align the said adjacent bodies and transmit loads therebetween.

References Cited by the Examiner

UNITED STATES PATENTS

| | | | |
|---|---|---|---|
| 2,530,762 | 11/1952 | Finigan et al. | 105—396 |
| 2,691,291 | 10/1954 | Henderson | 50—124 |
| 2,903,875 | 9/1959 | Bonatz et al. | 50—100 |
| 2,962,323 | 11/1960 | McBride | 105—423 |
| 3,061,134 | 10/1962 | Fesmire et al. | 220—1.5 |
| 3,073,466 | 1/1963 | Greer et al. | 220—1.5 |
| 3,100,458 | 8/1963 | Baker et al. | 105—397 |
| 3,115,982 | 12/1963 | Morrison | 220—1.5 |

FOREIGN PATENTS 478,075   2/1953   Italy.

ARTHUR L. LA POINT, *Primary Examiner.*

LEO QUACKENBUSH, *Examiner.*

D. E. HOFFMAN, *Assistant Examiner.*